(12) United States Patent
Samson et al.

(10) Patent No.: US 10,553,923 B2
(45) Date of Patent: Feb. 4, 2020

(54) PARALLEL PLATE WAVEGUIDE WITHIN A METAL PIPE

(71) Applicant: Halliburton Energy Services, Inc., Houston, TX (US)

(72) Inventors: Etienne Marcel Samson, Cypress, TX (US); John Laureto Maida, Jr., Houston, TX (US); David Andrew Barfoot, Houston, TX (US); Wolfgang Hartmut Nitsche, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 179 days.

(21) Appl. No.: 15/533,433

(22) PCT Filed: Oct. 4, 2016

(86) PCT No.: PCT/US2016/055251
§ 371 (c)(1),
(2) Date: Jun. 6, 2017

(87) PCT Pub. No.: WO2018/067116
PCT Pub. Date: Apr. 12, 2018

(65) Prior Publication Data
US 2019/0051962 A1 Feb. 14, 2019

(51) Int. Cl.
*H01P 3/20* (2006.01)
*H01P 11/00* (2006.01)
(Continued)

(52) U.S. Cl.
CPC .............. *H01P 3/20* (2013.01); *E21B 47/122* (2013.01); *H01P 3/10* (2013.01); *H01P 11/001* (2013.01); *H04B 10/90* (2013.01)

(58) Field of Classification Search
CPC . H01P 3/20; H01P 3/10; H01P 11/001; H04B 13/90; E21B 47/122
(Continued)

(56) References Cited

U.S. PATENT DOCUMENTS

| 4,249,300 A | 2/1981 | Sirel |
| 5,831,549 A | 11/1998 | Gearhart |

(Continued)

FOREIGN PATENT DOCUMENTS

WO 2015042291 A1 3/2015

OTHER PUBLICATIONS

D.R Grischkowsky, THz Photonics: The Synergy of Ultrafast Optics, Electronics, Micro-Microwaves, and Quasi-Optics, Oklahoma State University., Pub: Terahertz Science and Technology, ISSN 1941-7411, vol. 5, No. 1, Mar. 2012.
(Continued)

*Primary Examiner* — Robert J Pascal
*Assistant Examiner* — Jorge L Salazar, Jr.
(74) *Attorney, Agent, or Firm* — Howard L. Speight, PLLC

(57) ABSTRACT

A pipe has a longitudinal axis. A flex board extends along the longitudinal axis within the pipe and curls around the longitudinal axis. A cross-section of the flex board perpendicular to the longitudinal axis has a flex-board curve shape that has a first section on a first side of a line perpendicular to the longitudinal axis and a second section on a second side of the line perpendicular to the longitudinal axis. The first section has a first section shape and the second section has a second section shape. A first conductive stripe is coupled to the flex board, extends along the longitudinal axis, and follows the contour of the first section of the flex board. A second conductive stripe is coupled to the flex board, extends along the longitudinal axis, and follows the contour of the second section of the flex board.

17 Claims, 12 Drawing Sheets

(51) Int. Cl.
*E21B 47/12* (2012.01)
*H04B 10/90* (2013.01)
*H01P 3/10* (2006.01)

(58) Field of Classification Search
USPC ..... 333/21 R, 137, 243, 244, 256, 257, 260, 333/261; 340/854.9; 166/248, 60
See application file for complete search history.

(56) References Cited

U.S. PATENT DOCUMENTS

| | | | |
|---|---|---|---|
| 6,717,493 B2* | 4/2004 | Chopra | H01P 3/06 333/237 |
| 8,259,022 B2 | 9/2012 | Mendis et al. | |
| 8,309,925 B2 | 11/2012 | Mendis et al. | |
| 2003/0174030 A1 | 9/2003 | Chopra et al. | |
| 2007/0171007 A1 | 7/2007 | Mahlandt et al. | |
| 2009/0224936 A1 | 9/2009 | Vannuffelen et al. | |
| 2009/0273532 A1 | 11/2009 | Mendis et al. | |
| 2015/0086152 A1 | 3/2015 | Samson et al. | |
| 2016/0254583 A1* | 9/2016 | Sherrer | G02B 6/4415 333/243 |

OTHER PUBLICATIONS

Hou-Tong Chen, Igal Brener, Michael Cich, A Spatial Light Modulator for terahertz beams; Applied Physics Letters 94, 213511 (2009).

J.W. Carlin, A. Maione, Experimental Verification of Low-loss TM modes in dielectric-lined waveguide, The Bell system Technical Journal vol. 52, No. 4, Apr. 1973.

M.J. Fitch & R. Osiander, Terahertz Waves for Communications and Sensing; Pub: Johns Hopkins APL Technical Digest, vol. 25, No. 4 (2004).

Menlo Systems GmbH, Munich Germany, Tera K15 Terahertz Kit, Menio System K15 Spectrometer Manual, 2012.

Moumita Mukherjee, Wide Band Gap Semiconductor Based Highpower ATT Diodes in the MM-wave and THz Regime: Device Reliability, Experimental Feasibility and Photo-sensitivity, Advanced Microwave and Millimeter Wave Technologies Semiconductor Devices Circuits and Systems, ISBN: 978-953-307-031-5, InTech (2010).

Sanaz Zarei, Broadband terahertz modulation based on reconfigurable metallic slits, Photonics Society Winter Topicals Meeting Series 2010 IEEE Electrical Engineering and Computer Science Department, University of Michigan, Ann Arbor.

Thomas A. Abele, D.A. Alsberg, P.T. Hutchison, A High Capacity Digital Communication System using TE transmission in circular waveguide, IEEE Transactions on Microwave Theory and Techniques, vol. 32, No. 4, Apr. 1975.

International Searching Authority, Patent Cooperation Treaty, International Search Report, International Application No. PCT/US16/55251, which is a PCT parent to the instant application, dated Mar. 27, 2017.

International Searching Authority, Patent Cooperation Treaty, Written Opinion of the International Searching Authority, International Application No. PCT/US16/55251, which is a PCT parent to the instant application, dated Mar. 27, 2017.

* cited by examiner

US 10,553,923 B2

PARALLEL PLATE WAVEGUIDE WITHIN A METAL PIPE

RELATED APPLICATION

This application is a continuation-in-part of International Application No. PCT/US2014/056360, entitled "Quasioptical Waveguides and Systems," filed on Sep. 18, 2014, which claims the benefit of U.S. Provisional Application No. 61/880,426, filed Sep. 20, 2013.

TECHNICAL FIELD

The present invention relates generally to apparatus, systems, and methods related to oil and gas exploration.

BACKGROUND

In drilling wells for oil and gas exploration, understanding the structure and properties of the associated geological formation provides information to aid such exploration. Measurements in a wellbore, also referred to as a borehole, are typically performed to attain this understanding. However, the environment in which the drilling tools operate is at significant distances below the surface and measurements to manage operation of such equipment are made at these locations. In addition, it is important to monitor the physical conditions inside the borehole of the oil well, in order to ensure proper operation of the well. In turn, the data collected via monitoring and measurement is transmitted to the surface for analysis and control purposes.

Electrical cables have been investigated for high speed communications to and from downhole tools. However, use of electrical cables for such communication has drawbacks due to limitations with information bandwidth of electrical cables. Optical fibers have been investigated for high speed communications to and from downhole tools to overcome the information bandwidth limitations of electrical cables. For real-time communications of downhole measurements while drilling, there has been no realistic electrical cable solution, to date, due primarily to the large inductance and capacitance of such cables. Also, there has been no realistic optical fiber cable solution, to date, due primarily to the fact that near perfect optical alignment must be employed for low signal loss. There is ongoing effort to develop systems and methods that can allow for more flexibility without significant loss of precision in relatively high speed communication from and to tools located downhole at a drilling site.

DETAILED DESCRIPTION

Figure 1:
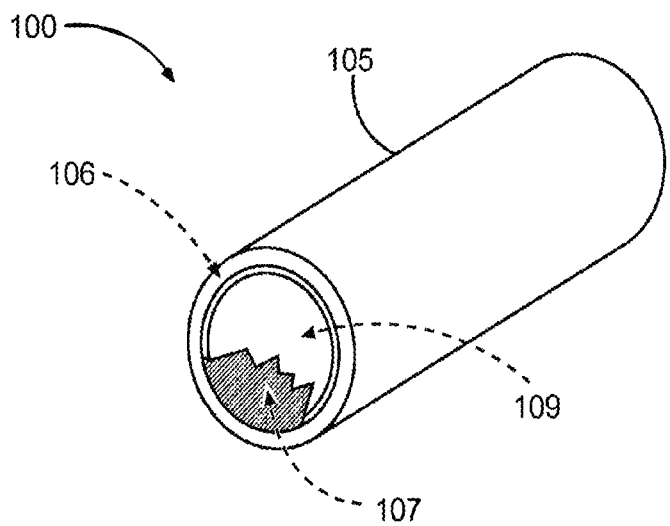
FIG. 1 shows an example waveguide that can be used in downhole communications, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, quasioptical electromagnetic (EM) wave energies can be used in methods for high speed command and data communication along pipelines. Such methods can be used for communications to and/or from downhole tools in a wellbore including downhole telemetry, while drilling, logging, or drilling and logging, and for terrestrial and aerial applications along pipelines and power lines. Logging includes wireline, slickline, and coiled tubing logging, among other types. These methods can provide capabilities not currently available in existing "cabled" forms of electromagnetic communications, such as electrical coaxial cables, twisted-pair cables, and optical fiber cables. Quasioptical EM wave energies are herein defined as EM wave energies of frequencies from 30 Gigahertz (GHz) to 10 Terahertz (THz). This frequency range includes EM frequency bands typically called millimeter waves (30 GHz to 300 GHz) and terahertz waves (100 GHz to 10 THz).

Very long millimeter and sub-millimeter EM radiation can be literally "piped" through long lengths of pipe forming a waveguide. In a wellbore for instance, the waveguide can be constructed in sections of jointed drill pipe lengths. Measurable zero-loss interconnect, or substantially zero-loss, connected (segmented) waveguide conduits may be used at standard drill pipe lengths, such as 30 or 40 ft. In addition, use of quasioptical waves can provide for a focused or highly directional signal in and out of structures arranged to propagate the quasioptical waves.

Quasioptical EM energy can be carried by waveguides without use of conventional electrical coaxial, twisted-pair conductors, or smaller optical fibers. Such waveguides can be structured as relatively large conduits, which can be hollow or filled. The waveguides can be dielectrically lined or plugged. Each jointed quasioptical waveguide can have electrically conductive and/or non-electrically conductive connectors at every pipe joint. Such segmented waveguides and connections can be arranged to operate as waveguides via low-loss total-internal reflection, similar to optical fibers, rather than a traditional electrical transmission line circuit. Also, with quasioptical wavelengths being approximately a thousand times larger than conventional near-infrared optical telecommunications wavelengths, precision physical connector alignment is not as difficult an issue as with the conventional near-infrared wavelengths.

The quasioptical waveguide can be realized in a number of different ways as a tube with an arbitrary cross section that is substantially uniform along a length of the tube. The quasioptical waveguide can be realized as a highly conductive metal to support quasioptical radiation propagation in various transverse electric (TE) or transverse magnetic (TM) waveguide modes of propagation. The quasioptical waveguide can be structured to provide single mode or multimode propagation. The conductive metal tube can be provided as copper pipes/tubes, steel tubes, inner lined steel, or other conductive metal tubes. As noted, tubes are not limited to circular cross sections, but may include square, rectangular, elliptical, or other cross sections. The conductive metal tube can be structured as a hollow tube or a dielectrically lined or filled tube, where the dielectric can be provided by vacuum, gas, liquid, or solid. For example, nitrogen gas can be used to fill a conductive metal tube. Other gases can be used that do not absorb the quasioptical radiation. The solid fill material may be a polymer or other structure that does not have a vibrational absorption band at the quasioptical frequencies used.

FIG. 1 shows an embodiment of an example waveguide 100 that can be used in downhole communications. The waveguide 100 can include a metal tube 105 with a conductive metal layer 107 on the inside surface of metal tube 105 and a dielectric layer 109 covering the conductive metal layer 107. Metal tube 105 can have an inner diameter that is large relative to an optical fiber but small relative to pipes used in drilling operations. The conductive metal layer 107 can be used to provide a highly conductive layer that can be relatively thin, such as, but not limited to, ranging from 1 micrometer (μm) to 20 μm, or about 2 μm to 10 μm, or about 3 to 8 μm. In one embodiment, the conductive layer may be 5 μm thick layer of copper or other highly conductive material. The dielectric layer 109 can provide a protective covering to the conductive metal layer 107. The dielectric layer 109 can be a small layer of a polymer, such as, but not limited to, polyethylene. The dielectric layer 109 may range in thickness from 50 μm to 500 μm, or about 100 μm to 250 μm, or about 150 to 200 μm. In one embodiment, the dielectric layer 109 may be 180 μm thick.

The inside diameter (ID) of the waveguide 100 can be round or rectangular (or square) or polygonal in geometric shape with effective TE and TM modal volume cross-sectional areas being similar. In FIG. 1, the inside diameter is shown as round, though as noted, other geometrical shapes can be used. The typical dimensions can be provided for a waveguide having a vacuum inner region or a gas-filled inner region. However, the conducting waveguide 100 may be filled with a solid dielectric, which will alter vacuum/gas dimensions accordingly.

For a circular waveguide, the cutoff wavelength for ideal single mode-only propagation can be given by 1.77r, where r is the inner radius in meters. For example, for circular gas-filled waveguides operating over the quasioptical EM band from 30 GHz (10,000 μm) to 10 THz (30 μm), the inner radius of a perfectly conducting tube can range from about 10,000 μm/1.77 to 30 μm/1.77, which is an inner radii from about 5.6 mm (11.3 mm diameter) down to about 17 μm (34 μm diameter). From these approximations, inside diameters can range from about 34 μm to as large as about 11 or 12 mm.

Internal dimensions will differ if the internal dielectric is a solid non-conductor, for example Teflon or other polymer, or if an inner thin dielectric coating is employed as shown by dielectric layer 109 in FIG. 1. Partial inner dielectric layers/coatings may be a small fraction of the overall inner diameter, which may be in the range of, but not limited to, 0.5% to 5% of the thickness of the inner diameter of the waveguide 100.

The waveguide 100 can have an outside diameter set to the inside diameter summed with twice the sum of wall thicknesses. An example of a range of outside diameters can include, but is not limited to, about 0.1 inches to about 0.6 inches.

The metal tube 105 may be structured from a material that can maintain its shape in harsh environments such as in wellbores. For example, the metal tube 105 can be, but is not limited to, a steel tube. The metal tube 105 can be selected of material of sufficient strength not be crushed during drilling operations. For mechanical crush resistance during installation and for good lifetime, the wall thickness of the outermost protective hydrostatic pressure barrier, such as but not limited to a stainless steel or incoloy sheath layer, may typically be about 0.049" thick, but can be 0.5 to 2× this typical thickness for good safe crush resistance.

Though examples are provided for relative sizes of waveguide 100, it is clear that other dimensions and materials can be used. The dimensions can be selected based on the desired electromagnetic mode to be propagated in waveguide 100.

Figure 2:
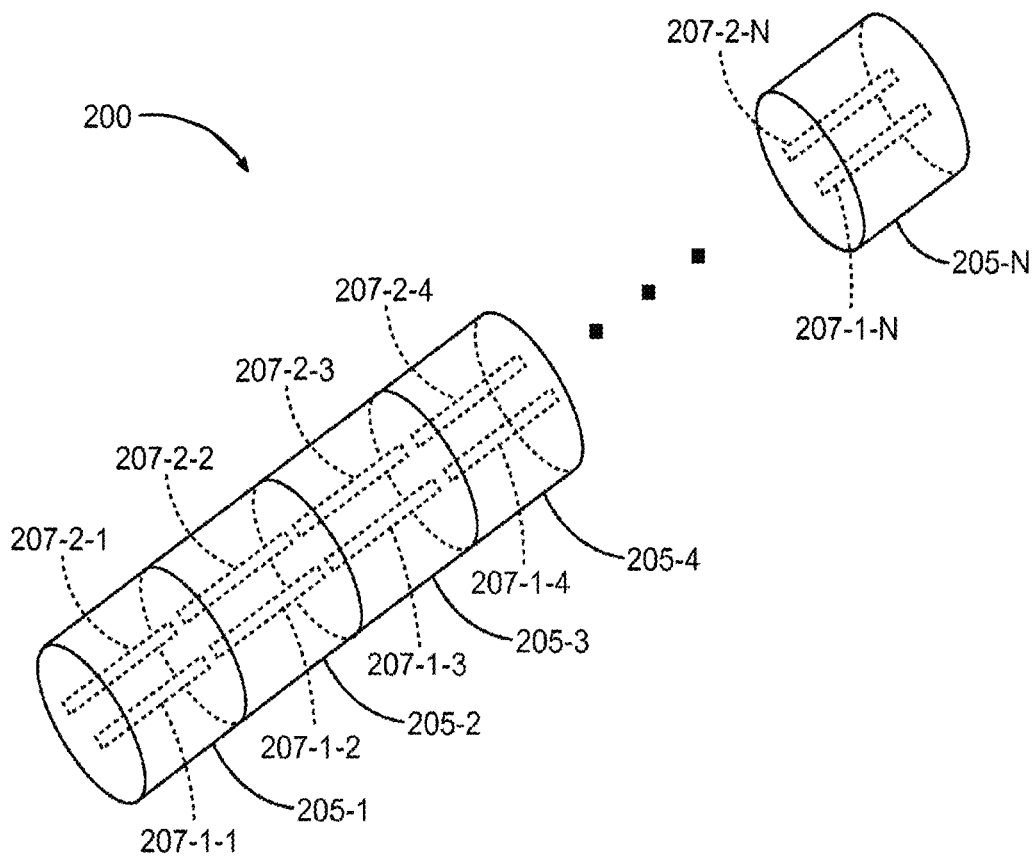
FIG. 2 shows an example of another form of a waveguide that can be implemented for operation downhole in a wellbore, in accordance with various embodiments.

FIG. 2 shows an embodiment of an example of another form of a waveguide 200 that can be implemented for operation downhole in a wellbore. Waveguide 200 can include a number of tubes 205-1, 205-2, 205-3, 205-4 . . . 205-N connected together with each tube having a parallel plate waveguide disposed within it. Plate 207-1-1 and plate 207-2-1 are structured as parallel plates in tube 205-1. Plate 207-1-2 and plate 207-2-2 are structured as parallel plates in tube 205-2. Plate 207-1-3 and plate 207-2-3 are structured as parallel plates in tube 205-3. Plate 207-1-4 and plate 207-2-4 are structured as parallel plates in tube 205-4. Plate 207-1-N and plate 207-2-N are structured as parallel plates in tube 205-N. Connecting the set of tubes together in a serial construction can be accomplished with adjacent plates 207-1-($i$) and 207-1-($i$+1) coupled together and adjacent plates 207-2-($i$) and 207-2-($i$+1) coupled together for i=1, 2 . . . N. The two plates may include flex board plates with conductive traces thereon such that the conductive traces are parallel to each other. The flex board plates may be arranged as traces on curled or curved polyimide, where the widths of the traces of the two plates together, across the cross section of the respective tube, may be substantially equivalent to the circumference of the inner diameter of the respective tube. The tubes 205-1, 205-2, 205-3, 205-4 . . . 205-N may be structured as steel tubes. As a non-limiting example, the tubes 205-1, 205-2, 205-3, 205-4 . . . 205-N may be structured similar to a conventional ¼" steel control line used in drilling operations.

Figure 3:
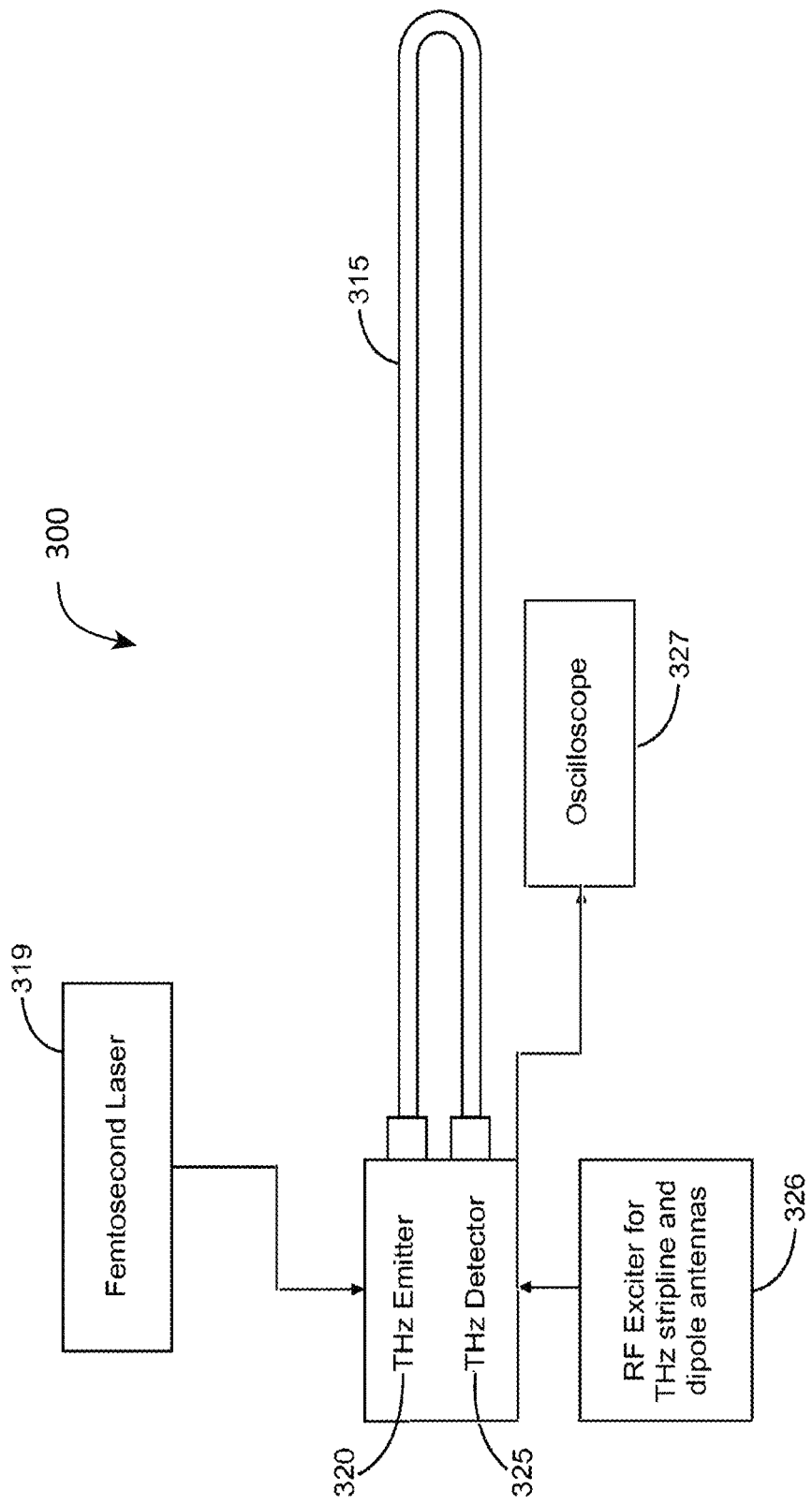
FIG. 3 shows a test apparatus that demonstrates waveguide transmission using terahertz wave radiation, in accordance with various embodiments.

FIG. 3 shows a test apparatus 300 that demonstrates waveguide transmission using THz wave radiation. An experiment was conducted with test apparatus 300 that demonstrated that THz wave radiation can be coupled into ordinary jointed copper tubing and be made to propagate along about 100 ft. with low power loss. A femtosecond 1560 nm laser driven THz Spectrometer (Menlo Systems/Batop Model K15) was used as a source of THz wave radiation with a peak THz wavelength of about 1 mm (300 GHz). The femtosecond laser 319 with peak laser wavelength of 1560 nm provided a pulse-width of approximately 100 fs with a 100 MHz repetition rate and 1450 nm to 1610 nm bandwidth. Various small copper pipes ranging in diameter from about ¼" to ½" were connected in a transmissive loop configuration 315 between the THz emitter 320 and a detector 325. A RF Exciter for THz stripline and dipole antennas 326 and an oscilloscope 327 were used in the measurement of received power. Relative received power levels were measured in an attempt to measure transmission loss. The received power between the THz emitter 320 butted to the detector 325 was measured as non-saturated reference power. The received power with the long copper piping of the transmissive loop configuration 315 inserted in between the THz emitter 320 and the detector 325 was measured. There was low THz power loss detected during the initial investigation leading to the conclusion that low loss THz transmission can be attained with conductive tubes. It is noted that U.S. Pat. No. 8,259,022 along with proven electromagnetic waveguide theory shows that a low loss THz transmission may be less than about 1 dB/km using air-filled parallel-plate waveguides between a transmitting end and a receiving end.

Research performed in the 1970s by Bell Laboratories provides a demonstration of electromagnetic wave transmission in the frequency band from 40 GHz to 110 GHz using $TE_{01}$ waveguide mode. In this demonstration, a bit stream of 274 Mbit/sec was transmitted along a distance of 25 miles using a copper tube waveguide similar to the test apparatus of FIG. 3. Attenuation in the waveguide was measured to average approximately 0.6 dB/km with an 80 GHz wave frequency. Theoretical modeling shows that the attenuation should continue to decrease at higher frequencies for an ideal copper waveguide with a dielectric coating. This research confirms theoretical calculations presented in *Microwave Engineering* (by David M. Pozar) for circular copper waveguides, which showed that the attenuation of the $TE_{01}$ decreases as wave frequency increases above 10 GHz. Additionally, it is known that all $TE_{0X}$ modes show monotonically decreasing attenuation with frequency for millimeter waves. Therefore, primarily exciting these modes, when transmitting into a circular waveguide, can provide for low attenuation in a millimeter wave transmission system and can reduce power transfer into other higher loss modes. In addition, although the TE modes are thought to be the lowest loss modes for transmission of millimeter waves in a circular waveguide, there is evidence presented in "Experimental verification of low-loss TM modes in dielectric-lined waveguide" (By J. W. CARLIN and A. MAIONE; The Bell System Technical Journal, Vol. 52, No. 4, April, 1973) that a properly designed waveguide can transmit TM modes with attenuation as low as 3.5 dB/km at 110 GHz, and perhaps lower attenuation at higher frequencies.

Figure 4A:
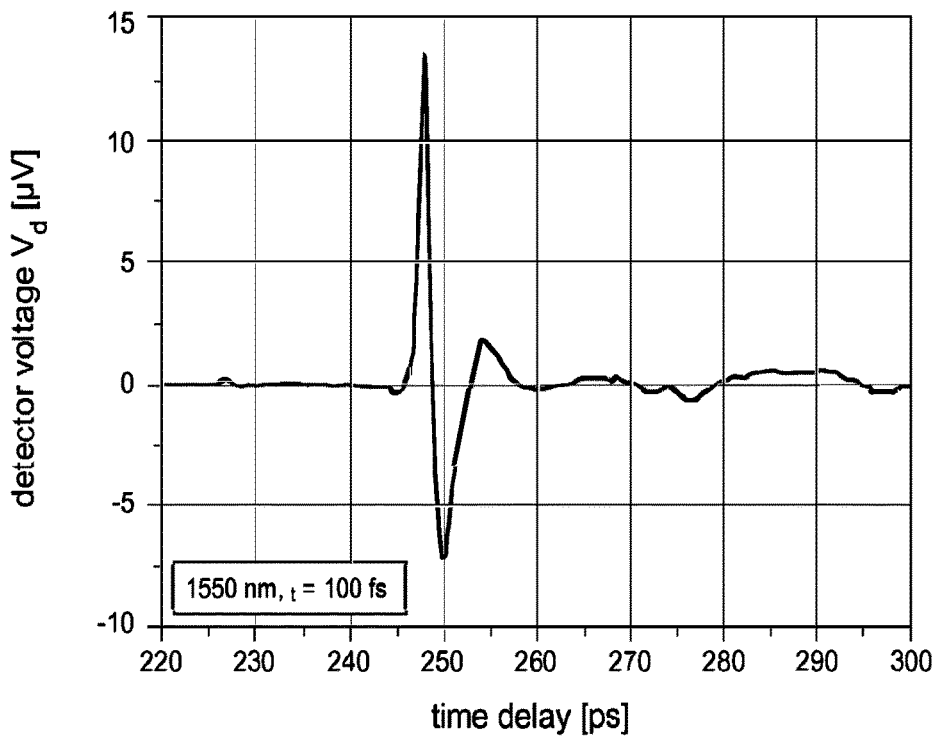
FIGS. 4A and 4B show a typical terahertz pulse and Fourier transform of a quasioptical bandwidth, in accordance with various embodiments.
Figure 4B:
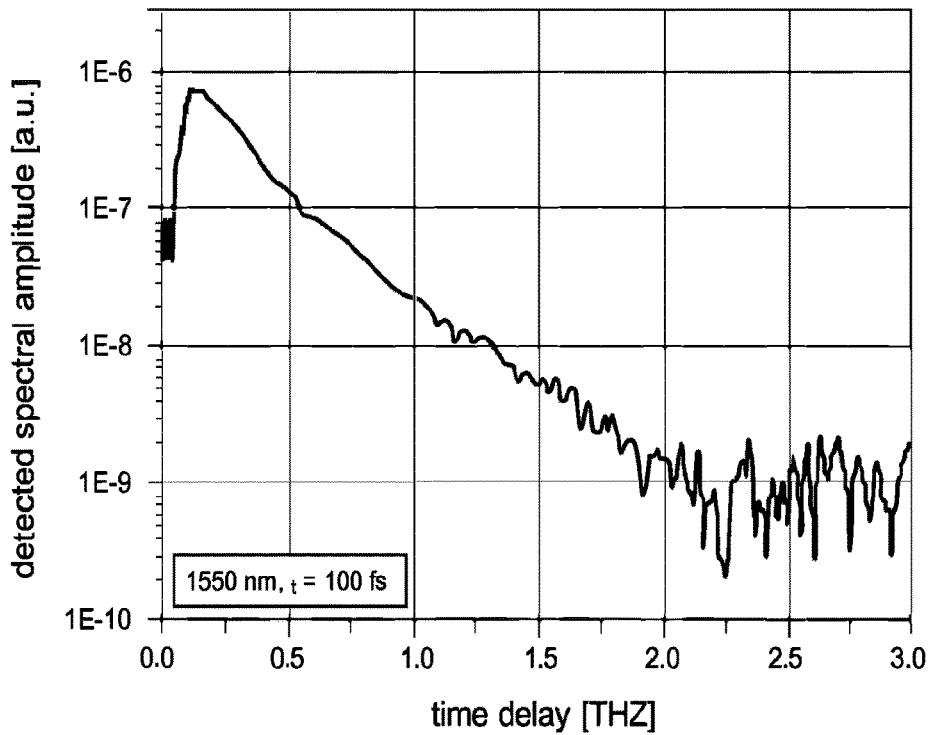

In various embodiments, a system can be structured to transmit and receive quasioptical signals. The system can include a transmitter operable to generate electromagnetic radiation in the frequency range from 30 GHz to 10 THz; a waveguide operatively coupled to the transmitter to propagate the electromagnetic radiation generated from the transmitter; a modulator disposed to receive the electromagnetic radiation from the waveguide, to modulate the electromagnetic radiation received from the waveguide, and to direct the modulated electromagnetic radiation back through the waveguide; and a detector operatively coupled to the waveguide to receive the modulated electromagnetic radiation. The waveguide can be structured as waveguide segments. The waveguide can have a cross section structure to excite only $TE_{01}$ propagation to the modulator. Alternatively, the waveguide can have a cross section structure to provide multi-mode propagation to the modulator. The system can be structured for high speed command and data communication in a wellbore or for terrestrial and aerial applications along pipelines and power lines. Techniques for generation and detection of quasioptical radiation for spectroscopy and imaging applications can be used for transmitters and detectors in systems taught herein. FIGS. 4A and 4B showed a typical THz pulse and Fourier transform of a quasioptical bandwidth.

The modulator to receive the quasioptical wave from the waveguide may be realized as a quasioptical wave modulator to modulate the quasioptical wave by deformable mirrors, choppers, electro-optic, or magneto-optic mechanisms. It is also anticipated that a CW quasioptical carrier wave can be generated, launched into the quasioptical waveguide, and transmitted to the modulator, where the modulator impresses information directly onto the CW quasioptical carrier wave. Quasioptical wave modulators suitable for high-speed telemetry have been fabricated and demonstrated in a laboratory setting. It is anticipated that quasioptical wave components, such as modulators, power splitters, filters, switches, etc., can be developed to impress and manipulate digital and/or analog information onto/off the quasioptical carrier of systems similar to or identical to systems discussed herein. Examples of efficient, high-speed quasioptical wave modulators can be found in "Broadband Terahertz Modulation based on Reconfigurable Metallic Slits" in photonics society winter topical meeting series 2010 IEEE, and "A spatial light modulator for terahertz beams" in Applied Physics Letters 94, 213511 (2009). The electromagnetic radiation from the transmitter may also be modulated by the same modulation method as employed at the end of the waveguide. For example, a transmitter and quasioptical wave modulator combination may be realized by modulating an excitation source or by external deformable mirrors, choppers, electro-optic, or magneto-optic mechanism modulating output from the transmitter prior to injection into the waveguide.

For frequencies below 1 THz, systems and methods, as taught herein, may be provided as low cost embodiments that may be implemented through the use of extremely high frequency semiconductor sources, modulators, and receivers conventionally designed for use with millimeter wave systems such as radar, wireless communication, etc. Sources are available for operating in frequency ranges up to 300 GHz, including silicon impact ionization avalanche transit-time (IMPATT) diodes and gun diodes as described in *Microwave Engineering*, pages 609-612, by David M. Pozar and in *Advanced Microwave and Millimeter Wave Technologies Semiconductor Devices Circuits and Systems*," (March 2010) edited by Moumita Mukherjee. Systems disclosed herein can include combinations and/or permutations of different components disclosed herein.

Figure 5:
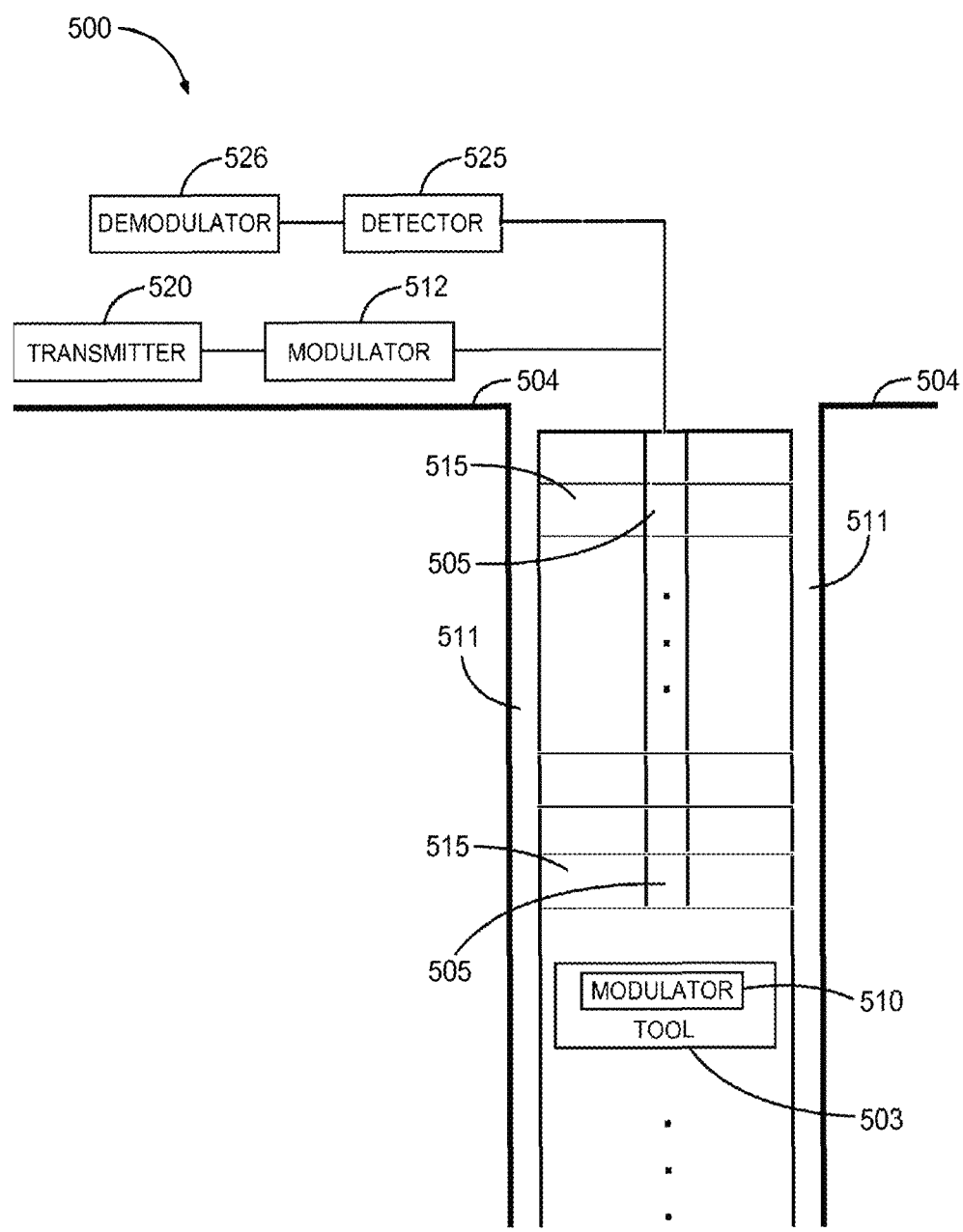
FIG. 5 shows a block diagram representation of an example system operable to transmit and receive quasioptical signals in a wellbore, in accordance with various embodiments.

FIG. 5 shows an embodiment of an example system 500 operable to transmit and receive quasioptical signals in a wellbore 511. The system 500 can include a transmitter 520 operable to generate electromagnetic radiation in the frequency range from 30 GHz to 10 THz; a waveguide 505 operatively coupled to the transmitter 520 to propagate the electromagnetic radiation generated from the transmitter 520; a modulator 510 disposed to receive the electromagnetic radiation from the waveguide 505, to modulate the electromagnetic radiation received from the waveguide 505, and to direct the modulated electromagnetic radiation back through the waveguide 505; and a detector 525 operatively coupled to the waveguide 505 to receive the modulated electromagnetic radiation. The waveguide 505 can be structured as waveguide segments. This system architecture provides for a single-ended (reflective) waveguide configuration for transmission back to surface 504, where it can be detected and demodulated using for example demodulator 526 to recover downhole tool information.

The transmitter 520 and the detector 525 can be disposed at a surface region 504 of a wellbore 511 with the modulator 510 disposed at a tool 503 disposed downhole in the wellbore 511. The waveguide 505 can be disposed in a drill pipe 515. Alternatively, the waveguide 505 can be disposed on the outside of the drill pipe 515.

The transmitter 520 may be realized by a number of different quasioptical wave generators/emitters. The quasioptical wave generators/emitter may include a free electron laser, a gas laser, a photoconductive dipole antenna, an electro-optic material with a femtosecond laser, an electronic emitter such as Gunn, Bloch oscillator, cold plasma emitters, or semiconductor THz laser. The transmitter 520 may include an average power level in the range from $10^{-9}$ to $10^2$ W. The transmitter 520 may be realized as a pair of distributed feedback lasers operating together to generate a beat note at a quasioptical frequency. The transmitter 520 can be selected based on a selected quasioptical frequency for propagation in waveguide 505. The transmitter 520 may be used with a modulator 512 to inject a quasioptical signal into waveguide 505. For example, a quasioptical wave modulator may be realized by modulating its excitation source at the surface 504 or by external deformable mirrors, choppers, electro-optic, or magneto-optic mechanism.

The detector 525 can be realized by a number of different quasioptical wave detectors/receivers. The quasioptical wave detectors/receiver can include a compact electronic detector, a photoconductive dipole and array, an electro-optic crystal with a femtosecond laser, a bolometer, or pyroelectric detector. The detector 525 may have a noise equivalent power (NEP) in the range $10^{-10}$ to $10^{-18}$ W/Hz$^{1/2}$. A quantum dot single photon detector having a NEP of about $10^{-22}$ W/Hz$^{1/2}$ may be implemented.

The modulator 510 at the end of the waveguide 505 may be realized as a quasioptical wave modulator by modulating the quasioptical wave by deformable mirrors, choppers, electro-optic, or magneto-optic mechanisms. At the surface, the electromagnetic radiation from the transmitter 520 may also be modulated by the same modulation method as employed at the end of the waveguide 505. However, it is anticipated that a CW quasioptical wave can be generated at the surface 504, launched into the quasioptical waveguide 505 and transmitted downhole to the tool 503, whereby, the tool 503 contains the modulator 510 to impress tool information directly onto the CW quasioptical carrier wave. Quasioptical wave modulators suitable for high-speed telemetry and downhole communications can be used as taught herein.

Figure 6:
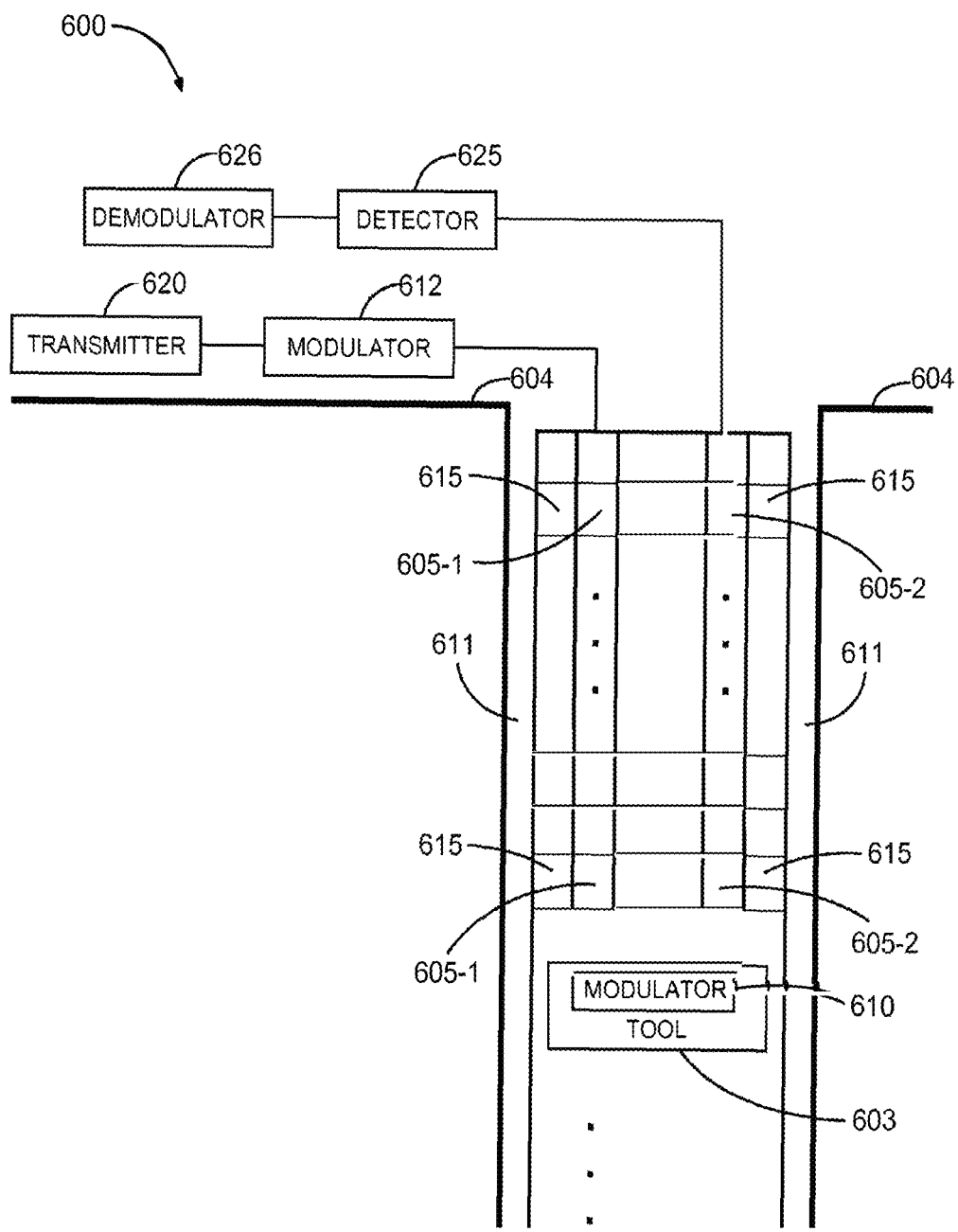
FIG. 6 shows a block diagram representation of an example system operable to transmit and receive quasioptical signals in a wellbore, in accordance with various embodiments.

FIG. 6 shows an embodiment of an example system 600 operable to transmit and receive quasioptical signals in a wellbore 611. The system 600 can include a transmitter 620 operable to generate electromagnetic radiation in the frequency range from 30 GHz to 10 THz; a first waveguide 605-1 operatively coupled to the transmitter 620 to propagate the electromagnetic radiation generated from the transmitter 620; a modulator 610 disposed to receive the electromagnetic radiation from the first waveguide 605-1, to modulate the electromagnetic radiation received from the first waveguide 605-1, and to direct the modulated electromagnetic radiation back through a second waveguide 605-2; and a detector 625 operatively coupled to the second waveguide 605-2 to receive the modulated electromagnetic radiation. The waveguides 605-1, 605-2 can be structured as waveguide segments. This system architecture provides for a looped waveguide configuration (dual waveguide configuration) for transmission back to surface 604, where it can be detected and demodulated using for example demodulator 626 to recover downhole tool information.

The transmitter 620 and the detector 625 can be disposed at a surface region 604 of a wellbore 611 with the modulator 610 disposed at a tool 603 disposed downhole in the wellbore 611. The waveguide 605-1 can be disposed in a drill pipe 615. Alternatively, the waveguide 605-1 can be disposed on the outside of the drill pipe 615. The waveguide 605-2 can be disposed in the drill pipe 615. Alternatively, the waveguide 605-2 can be disposed on the outside of the drill pipe 615. The waveguides 605-1, 605-2 can have a cross section structure to excite only $TE_{01}$ propagation. Alternatively, the waveguide waveguides 605-1, 605-2 can have a cross section structure to provide multi-mode propagation.

The transmitter 620 may be realized by a number of different quasioptical wave generators/emitters. The quasioptical wave generators/emitter may include a free electron laser, a gas laser, a photoconductive dipole antenna, an electro-optic material with a femtosecond laser, an electronic emitter such as Gunn, Bloch oscillator, cold plasma emitter, or semiconductor THz laser. The transmitter 620 may include an average power level in the range from $10^{-9}$ to $10^2$ W. The transmitter 620 may be realized as a pair of distributed feedback lasers operating together to generate a beat note at a quasioptical frequency. The transmitter 620 can be selected based on a selected quasioptical frequency for propagation in waveguide 605-1 and/or the combination of propagation in waveguides 605-1 and 605-2. The transmitter 620 may be used with a modulator 612 to inject a quasioptical signal into waveguide 605-1. For example, a quasioptical wave modulator may be realized by modulating its excitation source at the surface 604 or by external deformable mirrors, choppers, electro-optic, or magneto-optic mechanism.

The detector 625 can be realized by a number of different quasioptical wave detectors/receivers. The quasioptical wave detectors/receiver can include a compact electronic detector, a photoconductive dipole and array, an electro-optic crystal with a femtosecond laser, a bolometer, or pyroelectric detector. The detector 626 may have a noise equivalent power (NEP) in the range $10^{-10}$ to $10^{-18}$ W/Hz$^{1/2}$. A quantum dot single photon detector having a NEP of about $10^{-22}$ W/Hz$^{1/2}$ may be implemented.

The modulator 610 at the end of the waveguide 605-1 may be realized as a quasioptical wave modulator by modulating the quasioptical wave by deformable mirrors, choppers, electro-optic, or magneto-optic mechanisms. At the surface, the electromagnetic radiation from the transmitter 620 may also be modulated by the same modulation method as employed at the end of the waveguide 605-1. However, it is anticipated that a CW quasioptical wave can be generated at the surface 604, launched into the quasioptical waveguide 605-1 and transmitted downhole to the tool 603, whereby, the tool 603 contains the modulator 610 to impress tool information directly onto the CW quasioptical carrier wave. Quasioptical wave modulators suitable for high-speed telemetry and downhole communications can be used as taught herein.

Figure 7A:
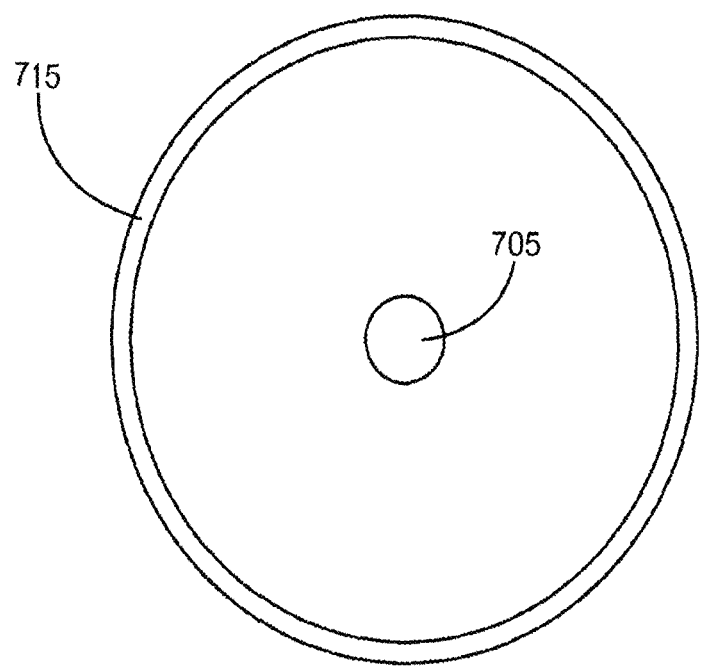
FIG. 7A shows an example of a drill pipe having a waveguide disposed within it, in accordance with various embodiments.

FIG. 7A shows cross-sections of an embodiment of an example a drill pipe 715 and a waveguide 705, where the waveguide 705 disposed within the drill pipe 715. The waveguide 705 can be realized as a conductive structure, as taught herein. The drill pipe 715 may be made of a material and have a geometric shape and length of a standard drill pipe used in the oil and gas industry. The use of such waveguides allows for connections that do not require the precision alignment associated with optical fibers. The waveguide 705 in drill pipe 715 arrangement can allow installation of the arrangement in a segmented control line style quasioptical wave transmission line within connected drill pipes during construction of a drill string via connection/disconnection with hydraulic wet connectors, as drill pipe is added or removed. It is noted that a waveguide such as waveguide 705 may be disposed in standard structures for terrestrial and aerial applications along pipelines and power lines.

Figure 7B:
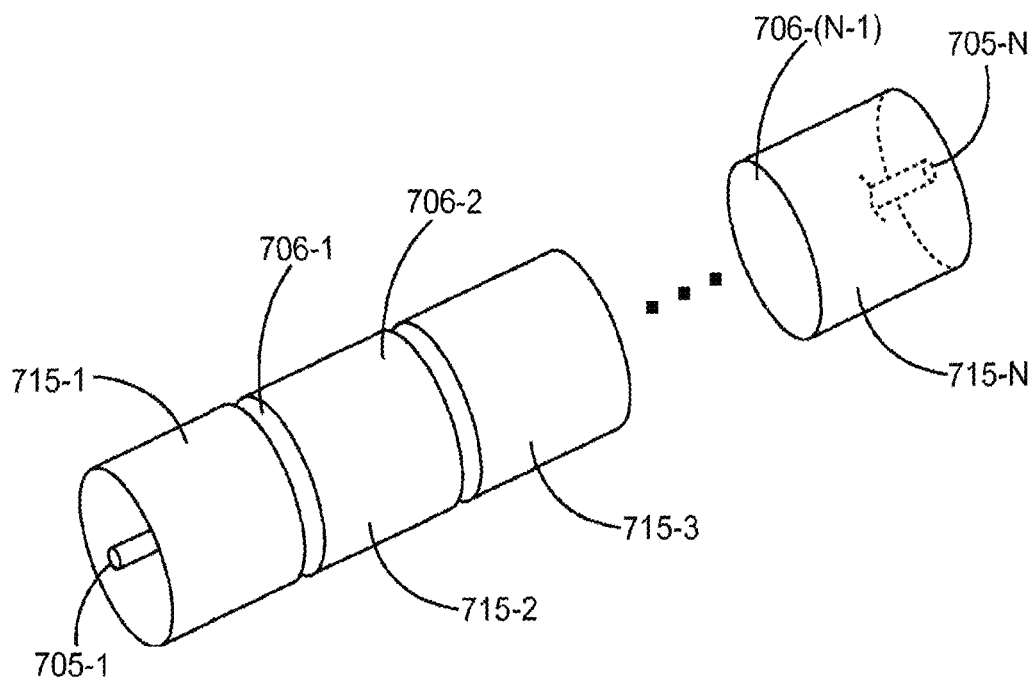
FIG. 7B shows an example of a number of drill pipes connected together, where each drill pipe has a waveguide disposed within it, as represented in FIG. 7A, in accordance with various embodiments.

FIG. 7B shows an embodiment of an example of a number of drill pipes 715-1, 715-2, 715-3 . . . 715-N connected together at each pipe joint, where each drill pipe has a waveguide disposed within it, such as represented in FIG. 7A. The combination of drill pipe 715-1 with its inner disposed waveguide 705-1 can be connected to the combination of drill pipe 715-2 and its inner disposed waveguide (not shown) by connector 706-1. The combination of drill pipe 715-2 and its inner disposed waveguide (not shown) can be connected to the combination of the combination of drill pipe 715-3 and its inner disposed waveguide (not shown) by connector 706-2. Each drill pipe/waveguide can be connected in such a manner up to connector 706-(N–1) connecting the combination of the last drill pipe 705-N and its inner disposed waveguide 705-N. The connected drill pipes 715-1, 715-2, 715-3 . . . 715-N provide for a quasioptical wave to be injected into and propagated in their associated waveguides. The connections may be hydraulic connections. Additional connectors can be used as a combination of drill pipe and inner disposed waveguide is added. Further, the connectors can be structured such that the combination of drill pipe and inner disposed waveguide can be removed.

Figure 8:
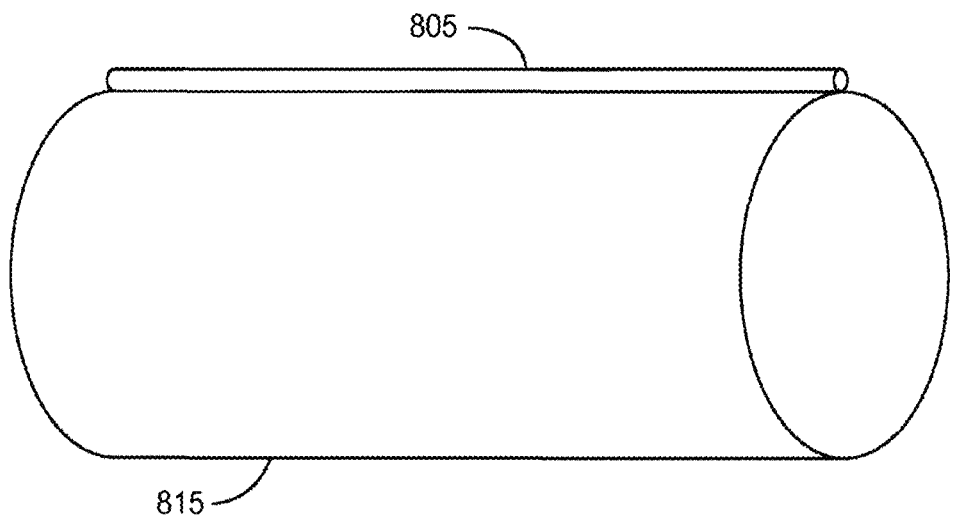
FIG. 8 shows an example of a drill pipe having a waveguide disposed outside the drill pipe, in accordance with various embodiments.

FIG. 8 shows an embodiment of an example drill pipe 815 having a waveguide 805 disposed outside the drill pipe 815. The waveguide 805 can be realized as a conductive structure, as taught herein. The drill pipe 815 may be made of a material and have a geometric shape and length of a standard drill pipe used in the oil and gas industry. The use of such waveguides allows for connections that do not require the precision alignment associated with optical fibers. The combination of the drill pipe 815 and the waveguide 805 can be connected to other combinations of drill pipe and outside waveguide using connectors in a manner similar to FIG. 7B. The waveguide 805 on the outside of the drill pipe 815 arrangement can allow installation of the arrangement in a segmented control line style quasioptical wave transmission line in conjunction with connected drill pipes during construction of a drill string via connection/disconnection with hydraulic wet connectors, as drill pipe is added or removed. It is noted that a waveguide, such as waveguide 805, may be disposed on standard structures for terrestrial and aerial applications along pipelines and power lines.

Figure 9:
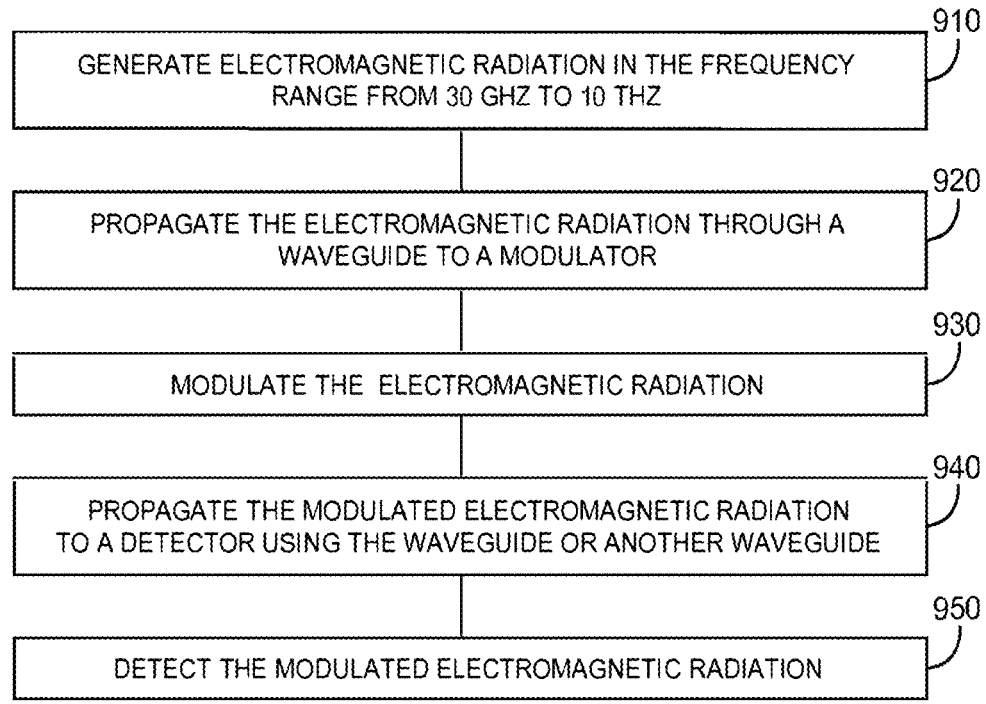
FIG. 9 shows features of an example method of communicating using quasioptical waves, in accordance with various embodiments.

FIG. 9 shows features of an embodiment of an example method of communicating using quasioptical waves. At 910, electromagnetic radiation in the frequency range from 30 GHz to 10 THz is generated from a transmitter. At 920, the electromagnetic radiation is propagated through a waveguide to a modulator. Propagating the electromagnetic radiation through the waveguide to the modulator can include propagating only a $TE_{01}$ mode. The method may include modulating the generated electromagnetic radiation before injecting the generated electromagnetic radiation into the waveguide. Modulating the generated electromagnetic radiation before injecting the generated electromagnetic radiation into the waveguide may include modulating the generated electromagnetic radiation using a deformable mirror.

At 930, the electromagnetic radiation is modulated by the modulator. Modulating the electromagnetic radiation can include modulating the electromagnetic radiation using a deformable mirror. Modulating the electromagnetic radiation can include inserting a data signal onto the electromagnetic radiation from a tool disposed downhole in a wellbore. At 940, the modulated electromagnetic radiation is propagated to a detector using the waveguide or another waveguide. At 950, the modulated electromagnetic radiation is detected at the detector. Generating electromagnetic radiation from the transmitter can include generating electromagnetic radiation from the transmitter disposed at a surface region of a wellbore; and propagating the modulated electromagnetic radiation to the detector can include propagating the modulated electromagnetic radiation to the detector disposed on the surface region of the wellbore. Methods disclosed herein can include combinations and/or permutations of different operational features disclosed herein.

Parallel Plate Waveguides

Researchers at Rice University recently showed that parallel plate waveguides can be used to transport terahertz (THz) radiation over long distance with extremely low losses (see U.S. Pat. Nos. 8,259,022 and 8,309,925).

Parallel plate waveguides typically have two plates with openings between the two plates on their boundaries. That is, the two plates in a parallel plate waveguide are finite in extent, are separated by a gap, and the gap opens into space at the boundaries of the plates. As such, it is impractical to insert parallel plate waveguide into oil well because fluids in the oil well, such as drilling mud and hydrocarbons, would flow into the openings around the boundaries of the plates and deteriorate the electromagnetic properties of the waveguide. In one or more embodiments, this problem is solved by filling the gap between the parallel plates with a dielectric material capable of surviving the high pressures and high temperatures in the oil well.

In one or more embodiments, the parallel plate waveguide is constructed inside a metal pipe, thereby combining the low losses of the parallel plate waveguide, the mechanical strength of the metal pipe, and the property of the metal pipe that it will exclude oil well fluids from flowing between the two plates.

Figure 10:
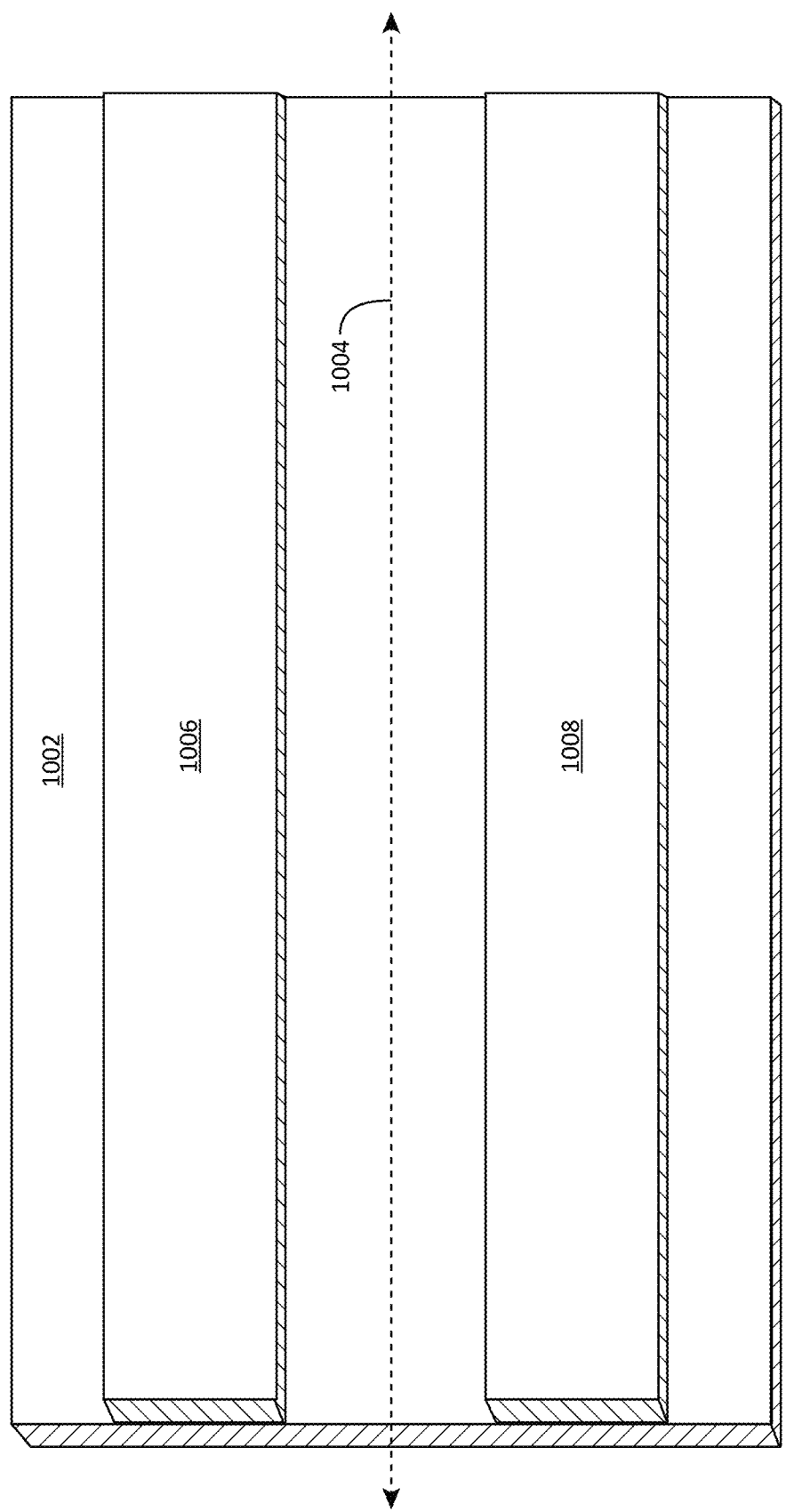
FIG. 10 shows a flex board with two copper stripes on its surface.

FIG. 10 shows a flex board with two copper stripes on its surface, which is used to construct a parallel plate waveguide. A flex board 1002 is manufactured to have a longitudinal axis 1004. The flex board 1002 is constructed of polyimide or another suitable material. Two conductive stripes 1006, 1008 extend along the flex board 1002 parallel to the longitudinal axis 1004. The conductive stripes 1006, 1008 are constructed of copper or another suitable conductive material. The conductive stripes 1006, 1008 maybe formed using electroless plating with standard photoresist etching techniques, such as those used to create a desired copper pattern on printed circuit boards, or by manufacturing the conductive stripes 1006, 1008 apart from the flex board 1002 and then affixing the conductive stripes 1006, 1008 to the flex board 1002 using an adhesive or another suitable technique.

Figure 11:
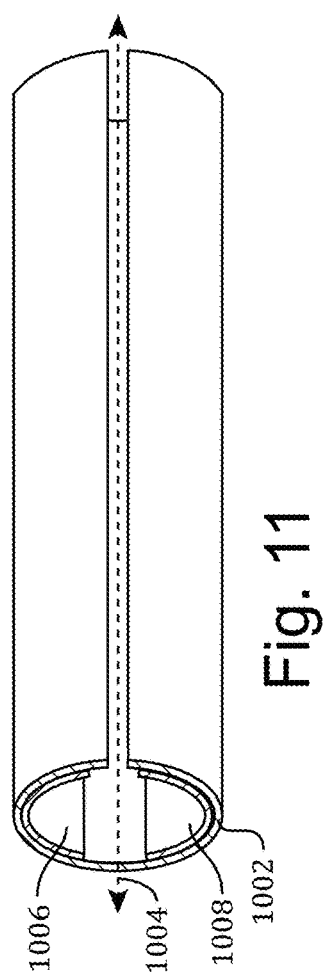
FIG. 11 shows the flex board of FIG. 10 rolled so that it forms a pipe shape with the two copper stripes on the inside.

FIG. 11 shows the flex board of FIG. 10 rolled so that it forms a pipe shape with the two copper stripes on the inside. This is done by rolling the flex board 1002 around the longitudinal axis 1004 so that the two conductive stripes 1006, 1008 face each other across the longitudinal axis 1004.

Figure 12:
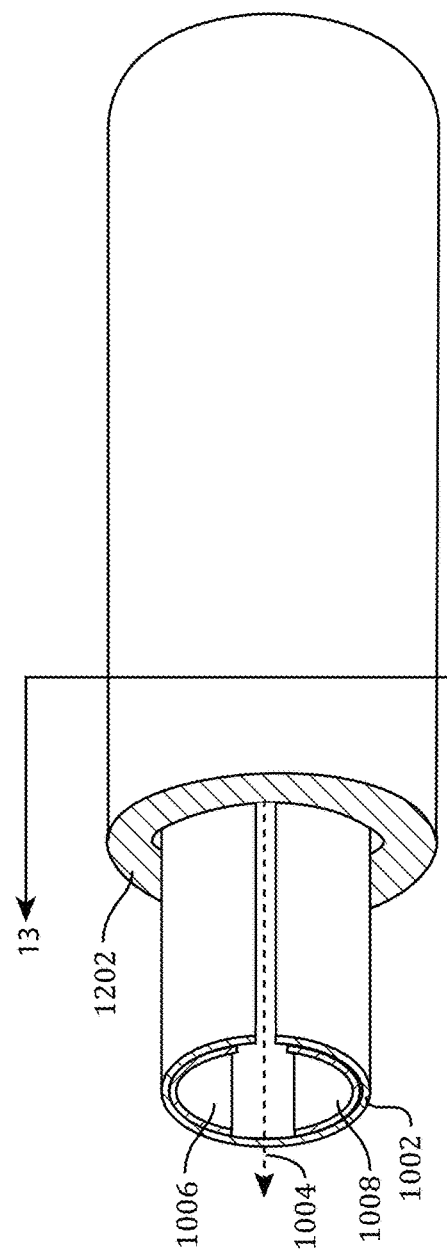
FIG. 12 shows the rolled flex board of FIG. 11 being inserted into a metal pipe.

FIG. 12 shows the rolled flex board of FIG. 11 being inserted into a metal pipe. This is done by inserting the rolled flex board 1002 into a pipe 1202. The pipe 1202 is constructed of steel, stainless steel, or another suitable metal or material for use in downhole environments, such as INCOLOY® (INCOLOY® is a registered trademark of Huntington Alloys Corporation), and has a wall thickness determined, for example, by the well-known Lamé formula, a discussion of which is found at http://www.finetubes-.co.uk/uploads/docs/e118_Safe_Tube_Pressures_Lo_Res.pdf, so that it can withstand the high downhole pressures, even if the parallel plate waveguide inside the pipe is filled with vacuum. As can be seen, the flex board 1002 presses against the inner surface of the pipe 1202 because it has a radial restoring force (i.e. a radial force attempting to unroll the rolled flex board 1002). Friction between the flex board 1002 and the pipe 1202 keeps the flex board 1002 in a fixed position and prevents it from slipping.

Alternatively, rather than inserting the rolled flex board 1002 into the pipe 1202, the flex board and the two conductive stripes 1006, 1008 may be inserted as the pipe 1202 is being manufactured. To do this, a flex board 1002 is manufactured to have a longitudinal axis 1004 and to have two conductive stripes 1006, 1008 extending along the flex board 1002 parallel to the longitudinal axis 1004. The flex board 1002 is coupled to a flat sheet of metal (pipe 1202 before rolling and welding). The metal (pipe 1202 before rolling and welding) and the flex board 1002 are rolled to form a pipe 1202. The pipe 1202 is closed on its side by welding. In one or more embodiments, the flex board 1002 is rolled before it is coupled to the flat sheet of metal (pipe 1202 before rolling and welding). In one or more embodiments, the flex board 1002 is flat, as shown in FIG. 10, before it is coupled to the flat sheet of metal (pipe 1202 before rolling and welding).

Figure 13:
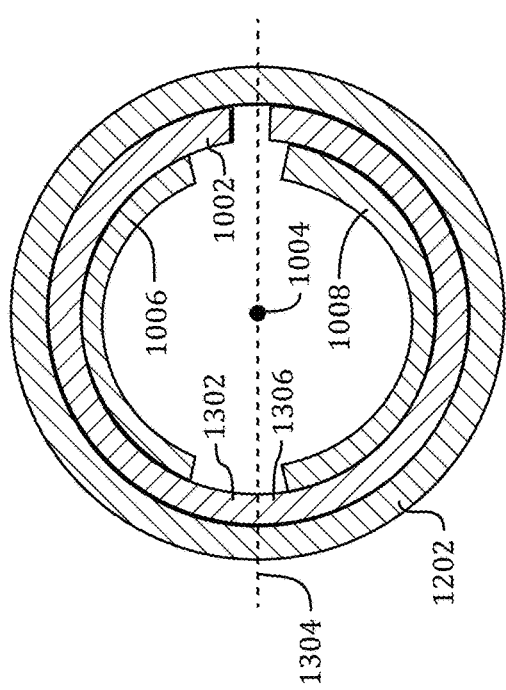
FIG. 13 shows a cross-sectional view of the flex board and metal pipe of FIG. 12.

FIG. 13 shows a cross-sectional view of the flex board and metal pipe of FIG. 12. The pipe 1202 has a longitudinal axis 1004 (which is the same as the longitudinal axis 1004 of the rolled flex board 1002). The flex board 1002 extends along the longitudinal axis 1004 within the pipe 1202 and curls around the longitudinal axis 1004. A cross-section of the flex board 1002 perpendicular to the longitudinal axis 1004, as shown in FIG. 13, has a flex-board curve shape (i.e., a "C" shape in FIG. 13) that has a first section 1302 on a first side of a line 1304 perpendicular to the longitudinal axis 1004 and a second section 1306 on a second side of the line 1304 perpendicular to the longitudinal axis 1004. The first section 1302 has a first section shape and the second section 1306 has a second section shape.

The first conductive plate 1006 is coupled to the flex board 1002, extends along the longitudinal axis 1004, and follows the contour of the first section 1302 of the flex board 1002. The second conductive plate is coupled to the flex board 1002, extends along the longitudinal axis, and follows the contour of the second section 1306 of the flex board 1002.

In one or more embodiments, the first section shape is a reflection around the line 1304 of the second section shape. More generally, however, as shown in FIG. 13, the first section shape is not a perfect reflection around the line 1304 of the second section shape, but is as close to that relationship as manufacturing standards allow. In one or more embodiments (not shown), the first section shape is not related (i.e., is not a (near) reflection, a (near) translation, or combination of such reflection and translation) of the second section shape, but the first section shape and the second section shape are chosen to create the best possibility of a parallel plate waveguide given the constraints of the downhole environment.

Figure 14:
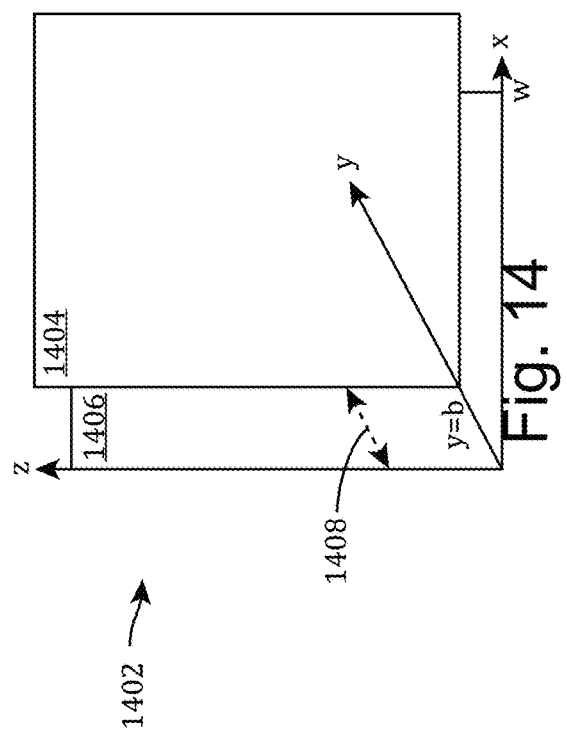
FIG. 14 shows a traditional parallel plate waveguide.

FIG. 14 shows a traditional parallel plate waveguide. In a traditional parallel plate waveguide 1402, two plates 1404, 1406 are separated by a gap 1408. In FIG. 14, plate 1404 is at y=0 and has a width w in the x direction. Plate 1406 is at y=b and has a width w in the x and z directions.

Figure 15:
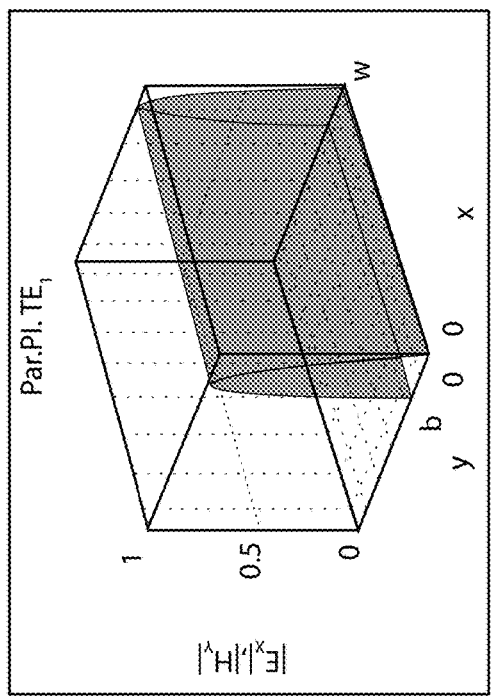
FIG. 15 shows the magnitude of the $E_X$ electric field component and the magnitude of the $H_Y$ magnetic field component of the $TE_1$ mode inside the parallel plate waveguide of FIG. 14.
Figure 16:
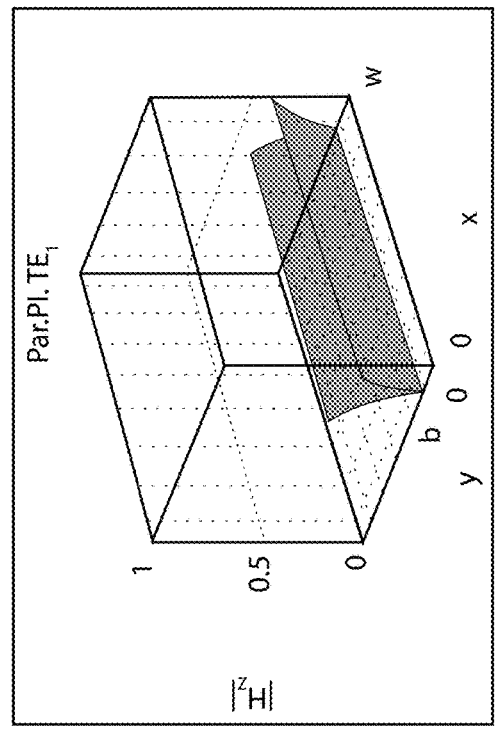
FIG. 16 shows the magnitude of the $H_Z$ magnetic field component of the $TE_1$ mode inside the parallel plate waveguide of FIG. 14.

FIG. 15 shows the magnitude of the $E_X$ electric field component and the magnitude of the $H_Y$ magnetic field component of the $TE_1$ mode inside the parallel plate waveguide of FIG. 14. FIG. 16 shows the magnitude of the $H_Z$ magnetic field component of the $TE_N$ mode inside the parallel plate waveguide of FIG. 14. As can be seen, $|E_X|$ and $|H_Y|$ approach 0 at the surfaces of the plates (i.e., at y=0 and at y=b), which means that these components do not cause any losses because the zero field magnitudes do not induce any currents within the plates 1404, 1406. While $|H_Z|$ has a non-zero amplitude at the plates 1404, 1406 and can induce current and causes losses, in a highly overmoded case (i.e., at high frequencies (i.e., 10 GHz to 10 THz) or for large distances (i.e., more than 5 mm) between the plates 1404, 1406), $|H_Z|$ becomes very small and the corresponding losses become very small, as can be calculated by the equation in U.S. Pat. No. 8,259,022, col. 8, lines 60-64. $|E_X|$ and $|H_Y|$ reach a maximum amplitude in the plane half way between the two plates (i.e., at y=b/2) but, in the traditional parallel plate waveguide, this magnitude do not cause any losses by inducing current because there is only vacuum in this plane. This is best achieved if the gap 1408 at the ends of the plate is open, as shown in FIG. 14. If these gaps are closed with metal or a dielectric the fields will induce current and produce losses. The parallel plate waveguide shown in FIGS. 10-13 is designed so that the pipe 1202 and the flex board 1002 do not effectively act as additional waveguide walls and avoid converting the parallel plate waveguide into a rectangular waveguide with walls on all 4 sides.

Figure 17:
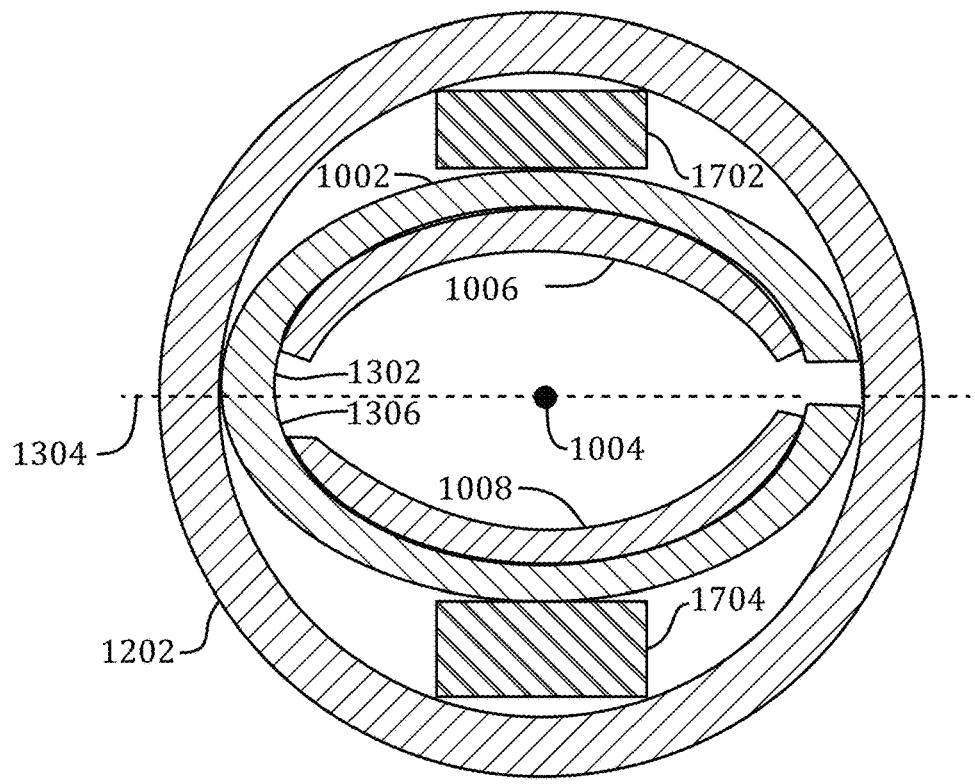
FIG. 17 shows a waveguide with spacers to deform the flex board and conductive stripes of FIGS. 12-13 into shapes closer to the parallel plate waveguide of FIG. 14.

FIG. 17 shows a waveguide with spacers to deform the flex board and conductive stripes of FIGS. 12-13 into shapes closer to the parallel plate waveguide of FIG. 14. In one or more embodiments, the arrangement in FIGS. 10-13 is modified by adding a first spacer 1702 between the pipe 1202 and the first section portion 1302 of the flex board 1002 and a second spacer 1704 between the pipe 1202 and the second section portion 1306 of the flex board 1002. The spacers 1702, 1704 change the shape of the flex board 1002 to a flattened C and change the shape of the conductive stripes 1006, 1008 as shown. As a result, the copper stripes 1006, 1008 are shaped more like parallel plates.

Figure 18:
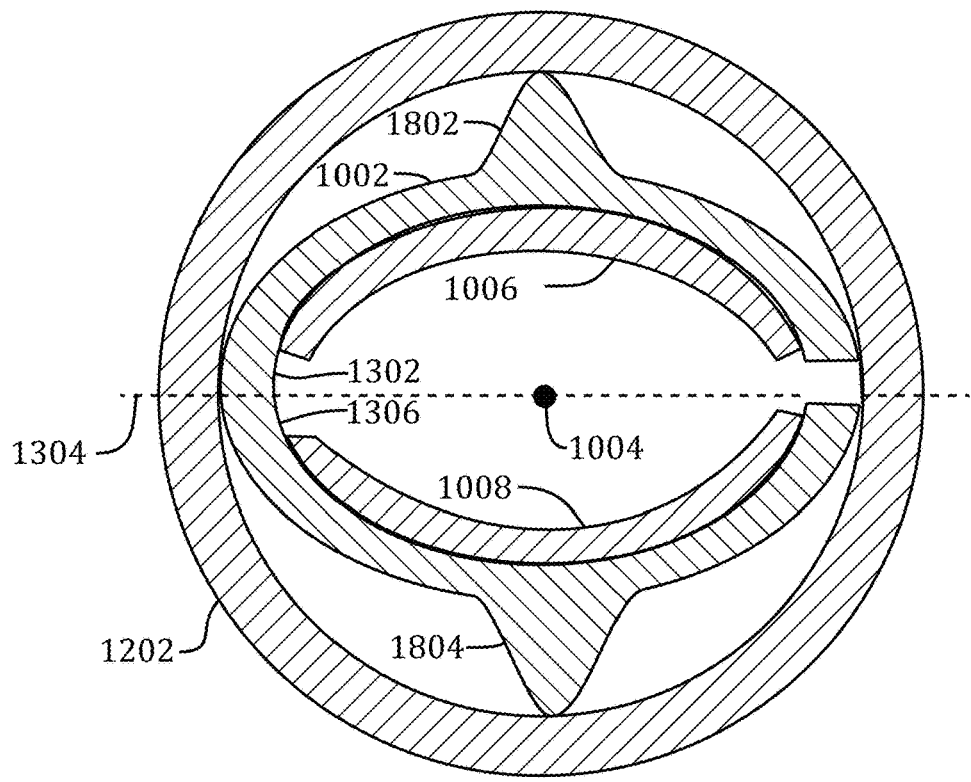
FIG. 18 shows a waveguide with a modified flex board to deform the conductive stripes of FIGS. 12-13 into shapes closer to the parallel plate waveguide of FIG. 14.

FIG. 18 shows a waveguide with a modified flex board to deform the conductive stripes of FIGS. 12-13 into shapes closer to the parallel plate waveguide of FIG. 14. In one or more embodiments, rather than using the spacers 1702, 1704, the thickness of the flex board 1002 is increased at locations 1802, 1804 to deform the conductive stripes 1006, 1008.

Figure 19:
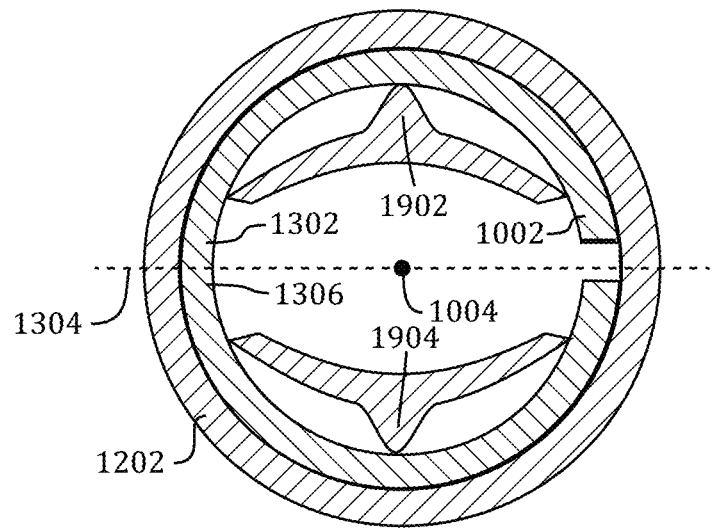
FIG. 19 shows a waveguide with a modified versions of the conductive stripes of FIGS. 12-13 that more closely approximate the parallel plate waveguide of FIG. 14.

FIG. 19 shows a waveguide with a modified versions of the conductive stripes of FIGS. 12-13 that more closely approximate the parallel plate waveguide of FIG. 14. In one or more embodiments, rather than using the spacers 1702, 1704, the thickness of the conductive stripes 1006, 1008 is increased at locations 1902 and 1904 to deform the conductive stripes 1006, 1008.

Figure 20:
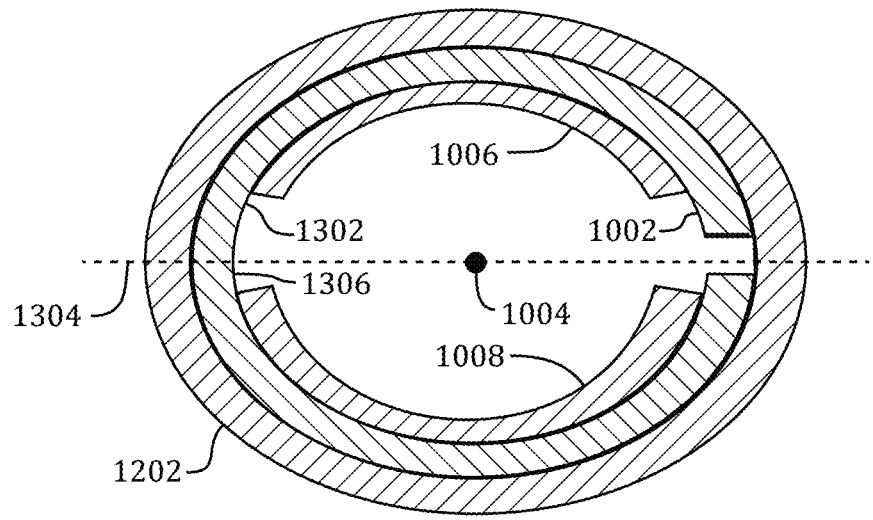
FIG. 20 shows a waveguide in which the pipe has been pressed into an elliptical shape to deform the flex board and conductive stripes of FIGS. 12-13 into shapes closer to the parallel plate waveguide of FIG. 14.

FIG. 20 shows a waveguide in which the pipe has been pressed into an elliptical shape to deform the flex board and conductive stripes of FIGS. 12-13 into shapes closer to the parallel plate waveguide of FIG. 14. Rather than using the spacers 1702, 1704, the entire pipe 1202 is pressed into an elliptical shape, as shown in FIG. 20.

In one or more embodiments, the tubes 205-1, 205-2, 205-3, 205-4 . . . 205-N discussed above in connection with FIG. 2 are replaced by parallel plate waveguides as shown in FIGS. 12, 13, 17-20.

In one or more embodiments, the waveguide 505, or segments thereof, discussed above in connection with FIG. 5 is replaced by a parallel plate waveguide as shown in FIGS. 12, 13, 17-20.

In one or more embodiments, the waveguides 605-1 and 605-2, or segments thereof, discussed above in connection with FIG. 6 are replaced by parallel plate waveguides as shown in FIGS. 12, 13, 17-20.

In one or more embodiments, the waveguide 705, or segments thereof, discussed above in connection with FIG. 7 is replaced by a parallel plate waveguide as shown in FIGS. 12, 13, 17-20.

In one or more embodiments, the waveguides 705-1, 705-2, 705-3, 705-4 . . . 705-N discussed above in connection with FIG. 7B are replaced by parallel plate waveguides as shown in FIGS. 12, 13, 17-20.

In one or more embodiments, the waveguide 805 discussed above in connection with FIG. 8 is replaced by parallel plate waveguides as shown in FIGS. 12, 13, 17-20.

In one aspect, an apparatus includes a pipe having a longitudinal axis. The apparatus includes a flex board extending along the longitudinal axis within the pipe and curled around the longitudinal axis. A cross-section of the flex board perpendicular to the longitudinal axis has a flex-board curve shape that has a first section on a first side of a line perpendicular to the longitudinal axis and a second section on a second side of the line perpendicular to the longitudinal axis. The first section has a first section shape and the second section has a second section shape. A first conductive stripe is coupled to the flex board. The first conductive stripe extends along the longitudinal axis and follows the contour of the first section of the flex board. A second conductive stripe is coupled to the flex board. The second conductive stripe extends along the longitudinal axis and follows the contour of the second section of the flex board.

Implementations may include one or more of the following. The first section shape may be a reflection around the line of the second section shape. The flex-board curve shape may be the shape of a C. The flex-board curve shape may be the shape of a flattened C. The apparatus may include a first spacer between the pipe and a first section portion of the flex board having the first section shape and a second spacer between the pipe and a second section portion of the flex board having the second section shape. The first spacer and the second space may cause the flex-board curve shape to be in the shape of a flattened C. The flex board may be constructed from a material chosen so that the flex board does not act as additional waveguide walls. The flex board may have an increased thickness adjacent to the two conductive stripes. The two conductive stripes may have increased thicknesses along longitudinal centers of the two conductive stripes.

In one aspect, a method includes manufacturing a flex board having a longitudinal axis and having two conductive stripes extending along the flex board parallel to the longitudinal axis. The method includes rolling the flex board around the longitudinal axis so that the two conductive stripes face each other across the longitudinal axis. The method includes inserting the rolled flex board into a pipe.

Implementations may include one or more of the following. Manufacturing the flex board may include creating the two conductive stripes using electroless plating and photoresist etching. Manufacturing the flex board may include creating the two conductive stripes using photoresist etching. Manufacturing the flex board may include cementing the two conductive stripes to the flex board. The method may include inserting a first spacer into the pipe with the rolled flex board on a first side of the rolled flex board and inserting a second spacer into the pipe with the rolled flex board on a second side, opposite the first side, of the rolled flex board. The flex board may have an increased thickness adjacent to the two conductive stripes. The two conductive stripes may have increased thicknesses along longitudinal centers of the two conductive stripes. The method may include pressing the pipe, the rolled flex board, and the two conductive stripes into an elliptical shape.

In one aspect, a method includes manufacturing a flex board having a longitudinal axis and having two conductive stripes extending along the flex board parallel to the longitudinal axis. The method includes coupling the flex board to a flat sheet of metal. The method includes rolling the metal and the flex board to form a pipe. The method includes closing the pipe on its side by welding.

Implementations may include one or more of the following. Manufacturing the flex board may include creating the two conductive stripes using electroless plating and photoresist etching. Manufacturing the flex board may include creating the two conductive stripes using photoresist etching. Manufacturing the flex board may include cementing the two conductive stripes to the flex board. The method may include inserting a first spacer between the flex board and the flat sheet of steel before rolling the steel and flex board and inserting a second spacer between the flex board and the flat sheet of steel before rolling the steel and flex board. The first spacer may be inserted in line with one of the two conductive stripes. The second spacer may be inserted in line with the other of the two conductive stripes. The flex board may have an increased thickness adjacent to the two conductive stripes. The two conductive stripes may have increased thicknesses along longitudinal centers of the two conductive stripes. The method may include pressing the pipe, the rolled flex board, and the two conductive stripes into an elliptical shape.

In one aspect, a system includes a transmitter operable to generate electromagnetic radiation in the frequency range from 30 GHz to 10 THz. The system further includes a parallel-plate waveguide operatively coupled to the transmitter to propagate the electromagnetic radiation generated from the transmitter. The parallel-plate waveguide has a steel pipe having a longitudinal axis, a flex board extending along the longitudinal axis within the steel pipe and curled around the longitudinal axis. A cross-section of the flex board perpendicular to the longitudinal axis is shaped in a curve that has a first section on a first side of a line perpendicular to the longitudinal axis and a second section on a second side of the line perpendicular to the longitudinal axis. The first section has a first section shape and the second section has a second section shape. The first section shape is a reflection around the line of the second section shape. A first conductive plate is coupled to the flex board. The first conductive plate extends along the longitudinal axis and follows the contour of the first section of the flex board. A second conductive plate is coupled to the flex board. The second conductive plate extends along the longitudinal axis and follows the contour of the second section of the flex board. A modulator is disposed to receive the electromagnetic radiation from the waveguide, to modulate the electromagnetic radiation received from the waveguide, and to direct the modulated electromagnetic radiation back through the waveguide. A detector is operatively coupled to the waveguide to receive the modulated electromagnetic radiation.

Implementations may include one or more of the following. The waveguide may be structured as waveguide segments. The transmitter and the detector may be disposed at a surface region of a wellbore and the modulator may be disposed at a tool disposed downhole in the wellbore. The waveguide may be disposed in a drill pipe. The waveguide may be disposed on the outside of a drill pipe. The waveguide may have a cross section structure to excite only $TE_1$ propagation to the modulator. The waveguide may have a cross section structure to provide multi-mode propagation to the modulator.

Systems and methods, similar or identical to systems and methods discussed herein, can provide quasioptical electromagnetic waveguide telemetry links deployed within a wellbore while drilling to provide real-time high speed telemetry to and from the downhole drill bit control assembly, where conventional systems and methods do not exist to provide such functionality and capabilities. Embodiments of system and methods can be realized for either single-ended waveguide (reflective configuration) or looped (dual waveguide configuration) transmission back to the surface, where quasioptical waves modulated downhole in a wellbore can be detected and demodulated to recover downhole tool information. Embodiments of system and methods, as taught herein, can allow high speed (potentially mega-bit to giga-bit) telemetry rates along standard drill pipes, outside or inside of the drill pipes, which can provide data while drilling. Such embodiments can allow installation of 30 ft to 40 ft standard drill pipe lengths having a segmented control line style quasioptical wave transmission line within the connected drill pipes during construction of a drill string via connection/disconnection with hydraulic wet connectors, as drill pipe is added or removed.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. An apparatus comprising:
   a pipe having a longitudinal axis;
   a flex board extending along the longitudinal axis within the pipe and curled around the longitudinal axis, wherein a cross-section of the flex board perpendicular to the longitudinal axis has a flex-board curve shape that has a first section on a first side of a line perpendicular to the longitudinal axis and a second section on a second side of the line perpendicular to the longitudinal axis, the first section having a first section shape and the second section having a second section shape;
   a first conductive stripe coupled to the flex board, the first conductive stripe extending along the longitudinal axis and following the contour of the first section of the flex board; and
   a second conductive stripe coupled to the flex board, the second conductive stripe extending along the longitudinal axis and following the contour of the second section of the flex board;
   a first spacer between the pipe and a first section portion of the flex board having the first section shape; and
   a second spacer between the pipe and a second section portion of the flex board having the second section shape;
   wherein the first spacer and the second space cause the flex-board curve shape to be in the shape of a flattened C.

2. The apparatus of claim 1, wherein the first section shape is a reflection around the line of the second section shape.

3. The apparatus of claim 1 wherein the flex board is constructed from a material chosen so that the flex board does not act as additional waveguide walls.

4. An apparatus comprising:
   a pipe having a longitudinal axis;
   a flex board extending along the longitudinal axis within the pipe and curled around the longitudinal axis, wherein a cross-section of the flex board perpendicular to the longitudinal axis has a flex-board curve shape that has a first section on a first side of a line perpendicular to the longitudinal axis and a second section on a second side of the line perpendicular to the longitudinal axis, the first section having a first section shape and the second section having a second section shape;
   a first conductive stripe coupled to the flex board, the first conductive stripe extending along the longitudinal axis and following the contour of the first section of the flex board; and a second conductive stripe coupled to the flex board, the second conductive stripe extending along the longitudinal axis and following the contour of the second section of the flex board; and wherein the flex board has an increased thickness along longitudinal centers of the two conductive stripes.

5. The apparatus of claim 4 wherein the flex-board curve shape is the shape of a C.

6. The apparatus of claim 4 wherein the flex-board curve shape is the shape of a flattened C.

7. An apparatus comprising:

a pipe having a longitudinal axis;

a flex board extending along the longitudinal axis within the pipe and curled around the longitudinal axis, wherein a cross-section of the flex board perpendicular to the longitudinal axis has a flex-board curve shape that has a first section on a first side of a line perpendicular to the longitudinal axis and a second section on a second side of the line perpendicular to the longitudinal axis, the first section having a first section shape and the second section having a second section shape;

a first conductive stripe coupled to the flex board, the first conductive stripe extending along the longitudinal axis and following the contour of the first section of the flex board; and a second conductive stripe coupled to the flex board, the second conductive stripe extending along the longitudinal axis and following the contour of the second section of the flex board; and wherein the two conductive stripes have increased thicknesses along longitudinal centers of the two conductive stripes.

8. A method comprising:

manufacturing a flex board having a longitudinal axis and having two conductive stripes extending along the flex board parallel to the longitudinal axis;

rolling the flex board around the longitudinal axis so that the two conductive stripes face each other across the longitudinal axis;

inserting the rolled flex board into a pipe;

pressing the pipe, the rolled flex board, and the two conductive stripes into an elliptical shape.

9. The method of claim 8 further comprising:

inserting a first spacer into the pipe with the rolled flex board on a first side of the rolled flex board; and inserting a second spacer into the pipe with the rolled flex board on a second side, opposite the first side, of the rolled flex board.

10. The method of claim 8 wherein:

manufacturing the flex board comprises creating the two conductive stripes using electroless plating and photoresist etching.

11. The method of claim 8 wherein:

manufacturing the flex board comprises creating the two conductive stripes using photoresist etching.

12. The method of claim 8 wherein:

manufacturing the flex board comprises cementing the two conductive stripes to the flex board.

13. A method comprising:

manufacturing a flex board having a longitudinal axis and having two conductive stripes extending along the flex board parallel to the longitudinal axis;

coupling the flex board to a flat sheet of metal;

rolling the metal and the flex board to form a pipe;

closing the pipe on its side by welding;

inserting a first spacer between the flex board and the flat sheet of steel before rolling the steel and flex board; and inserting a second spacer between the flex board and the flat sheet of steel before rolling the steel and flex board.

14. The method of claim 13 wherein:

manufacturing the flex board comprises creating the two conductive stripes using electroless plating and photoresist etching.

15. The method of claim 13 wherein:

manufacturing the flex board comprises creating the two conductive stripes using photoresist etching.

16. The method of claim 13 wherein:

manufacturing the flex board comprises cementing the two conductive stripes to the flex board.

17. The method of claim 13 wherein:

the first spacer is inserted in line with one of the two conductive stripes; and the second spacer is inserted in line with the other of the two conductive stripes.

* * * * *